United States Patent
Harvey (10) Patent No.: US 7,631,012 B2
(45) Date of Patent: Dec. 8, 2009

(54) SYSTEM AND METHOD OF OPERATING A DATABASE

(75) Inventor: Richard Hans Harvey, Ringwood (AU)

(73) Assignee: Computer Associates Think, Inc., Islandia, NY (US)

(*) Notice: Subject to any disclaimer, the term of this patent is extended or adjusted under 35 U.S.C. 154(b) by 0 days.

(21) Appl. No.: 09/844,043

(22) Filed: Apr. 27, 2001

(65) Prior Publication Data

US 2002/0059199 A1 May 16, 2002

Related U.S. Application Data (60) Continuation-in-part of application No. 09/721,806, filed on Nov. 24, 2000, and a continuation-in-part of application No. 09/427,266, filed on Oct. 26, 1999, now abandoned, which is a division of application No. 08/793,575, filed on May 22, 1997, now Pat. No. 6,052,681.

(51) Int. Cl.
*G06F 17/30* (2006.01)

(52) U.S. Cl. .................... 707/104.1; 707/3; 707/6; 707/10

(58) Field of Classification Search ........... 707/104, 707/3, 501, 4, 10, 102, 104.1, 6, 100
See application file for complete search history.

(56) References Cited

U.S. PATENT DOCUMENTS

| | | | | |
|---|---|---|---|---|
| 4,914,571 A | | 4/1990 | Baratz et al. ............. 364/200 |
| 5,117,349 A | * | 5/1992 | Tirfing et al. ................ 707/3 |
| 5,218,699 A | | 6/1993 | Brandle et al. ............ 395/650 |
| 5,291,583 A | | 3/1994 | Bapat ..................... 395/500 |
| 5,317,742 A | | 5/1994 | Bapat ..................... 395/700 |
| 5,333,317 A | | 7/1994 | Dann ..................... 395/600 |
| 5,388,255 A | | 2/1995 | Pytlik et al. |
| 5,412,804 A | * | 5/1995 | Krishna .................... 707/2 |
| 5,414,812 A | | 5/1995 | Filip et al. |
| 5,442,690 A | | 8/1995 | Nazif et al. ............. 379/207 |
| 5,491,817 A | | 2/1996 | Gopal et al. ............ 395/600 |
| 5,530,853 A | * | 6/1996 | Schell et al. ............... 707/1 |

(Continued)

FOREIGN PATENT DOCUMENTS

EP    0 689 148 A1    5/1995

(Continued)

OTHER PUBLICATIONS

M. Jarke, J. Koch, "Query Optimization in Database Systems," ACM Computing Surveys, vol. 16, No. 2, Jun. 1984, pp. 111-152, XP002229970.

(Continued)

*Primary Examiner*—Jean M Corrielus
(74) *Attorney, Agent, or Firm*—Baker Botts L.L.P.

(57) ABSTRACT

A method of processing a database service query that results in improved service query performance is provided. In one embodiment, the method includes receiving a service query that includes a filter having one or more filter items, expanding the filter, and applying at least one condition test to each filter item. An example of a test condition includes determining if each filter item includes a NOT connective and is either of first form or a second form of filter item. The first form may be a type only filter item and the second form may be a type and value filter item.

27 Claims, 7 Drawing Sheets

U.S. PATENT DOCUMENTS

| | | | |
|---|---|---|---|
| 5,548,726 A | | 8/1996 | Pettus |
| 5,634,053 A | | 5/1997 | Noble et al. |
| 5,649,182 A | * | 7/1997 | Reitz ............................ 707/7 |
| 5,664,172 A | | 9/1997 | Antoshenkov .............. 395/604 |
| 5,692,181 A | | 11/1997 | Anand et al. |
| 5,794,232 A | | 8/1998 | Mahlum et al. |
| 5,806,061 A | * | 9/1998 | Chaudhuri et al. ............. 707/3 |
| 5,864,840 A | | 1/1999 | Leung et al. .................... 707/2 |
| 5,878,415 A | | 3/1999 | Olds ............................. 707/9 |
| 5,953,716 A | | 9/1999 | Madnick et al. |
| 5,970,497 A | | 10/1999 | Burrows ..................... 707/102 |
| 5,987,446 A | | 11/1999 | Corey et al. |
| 6,009,422 A | * | 12/1999 | Ciccarelli ...................... 707/4 |
| 6,016,497 A | | 1/2000 | Suver ......................... 707/103 |
| 6,016,499 A | | 1/2000 | Ferguson .................... 707/104 |
| 6,052,681 A | * | 4/2000 | Harvey .......................... 707/3 |
| 6,085,188 A | | 7/2000 | Bachman et al. |
| 6,112,198 A | * | 8/2000 | Lohman et al. ................. 707/3 |
| 6,112,304 A | | 8/2000 | Clawson ..................... 713/156 |
| 6,119,129 A | | 9/2000 | Traversat et al. ............ 707/202 |
| 6,122,627 A | | 9/2000 | Carey et al. |
| 6,182,153 B1 | | 1/2001 | Hollberg et al. ............. 709/315 |
| 6,192,405 B1 | | 2/2001 | Bunnell ....................... 709/225 |
| 6,199,062 B1 | * | 3/2001 | Byrne et al. ................... 707/3 |
| 6,236,988 B1 | | 5/2001 | Aldred .......................... 707/3 |
| 6,356,892 B1 | * | 3/2002 | Corn et al. ..................... 707/3 |
| 2001/0037339 A1 | | 11/2001 | Harvey |
| 2003/0105749 A1 | | 6/2003 | Harvey |
| 2003/0191759 A1 | | 10/2003 | Harvey |
| 2003/0208478 A1 | | 11/2003 | Harvey |
| 2006/0020613 A1 | | 1/2006 | Harvey ....................... 707/100 |

FOREIGN PATENT DOCUMENTS

| | | |
|---|---|---|
| GB | 2 329 044 A | 5/1997 |
| WO | WO 96/07147 A1 | 3/1996 |
| WO | WO 96/34350 | 4/1996 |

OTHER PUBLICATIONS

S. Grumbach, T. Milo, "Towards Tractable Algebras for Bags," Proc. 12th Intl. Conf. on Management of Data and Symposium on Principles of Database Systems, May 1993, pp. 49-58, XP002233522, Washington, D.C.
The Proceedings of IFIP WG6.6 International Symposium (ISBN: 0444 889 167) Francois Peruchond, Cuno Lanz & Bernard Plattner "A Relational Data Base Design for an X.500 Directory System Agent".—pp. 405-418.
"Object-Oriented Modeling and Design" by J. Rumbaugh, et al., 1991, ISBN 0-13-630054-5, pp. 366-396.
CCITT, vol. VIII, Data Communication Networks Directory Recommendations X.500-X521 ISBN 92-61-03731-3.
Database Design and Management, David Stampler and Wilson Price, 1990 ISBN 0-07-100934-5, pp. 295-323.
Molesworth, R., "An Overview of the CCITT X.500 Directory System" Second IEE National Conference on Telecommunications, No. 1989, Apr. 2, 1989, pp. 179-183.
Hung, R. "CCITT X.500 Directories—Principles and Applications" Computer Communications, vol. 15, No. 10, Dec. 1, 1992, pp. 636-645.
Ordille J J et al., "Nomenclator Descriptive Query Optimization for Large X.500 Environments" Computer Communications Review, vol. 21, No. 4, Sep. 1, 1991, pp. 185-196.
Bohdan Smetaniuk: "Distributed Operation of the X.500 Directory" Computer Networks and ISDN Systems, vol. 21, No. 1, Mar. 1, 1991, pp. 17-40.
Cooke B. et al., "Directory Services in the HP Map 3.0 Environment" Hewlett-Packard Journal, vol. 41, No. 4, Aug. 1, 1990, pp. 15-23.
Heywood P. et al., "A Big Step Toward A Global Directory", Data Communications, vol. 23, No. 1, Jan. 1, 1994, pp. 99-100.

The Proceedings of IREE, ACTS '91, Apr. 22-24, 1991 (ISBN: 0909394 253), C.M.R. Leung "GDSA: An X.500 Directory Implementation Supporting Heterogeneous Databases."; pp. 84-96.
1266 Hewlett-Packard Journal 41 (1990) Aug., No. 4, Palo Alto, CA, US, Directory Services in the HP Map 3. Environment; B. Cooke, C. Fettig, P. Koski, D. Swope and R. Vandoorn, pp. 15-23.
European Communication dated Apr. 2, 1998.
PCT Written Opinion (PCT Rule 66) dated May 27, 1996.
PCT Notification of Transmittal of International Preliminary Examination Report dated Dec. 23, 1996.
PCT Written Opinion (PCT Rule 66) dated Sep. 19, 1996.
PCT Written Opinion (PCT Rule 66) dated Aug. 5, 1996.
Communication Pursuant to Article 96(2) EPC Apr. 12, 2001.
The Directory—Overview of Concepts, Models and Services (Melbourne, 1988), Recommendation X.500 and ISO 9594-1 (pp. 3-19), 1988.
U.S. Appl. No. 09/427,263, Oct. 26, 1999.
U.S. Appl. No. 09/721,806, Nov. 24, 2000.
Leung, C.M.R., *An Object-Oriented Approach to Directory Systems*, IEEE Region 10 Conference on Computer and Communications Systems, Hong Kong, pp. 736-740, Sep. 1990.
Bauer, M.A. et a., *A Simulation Model for X.500 Directories: Initial Experiences*, Department of Computer Science, The University of Western Ontario, pp. 255-276, 1991.
Hong, James W. et al., *Design and Implementation of a Distributed Applications Testbed*, Department of Computer Science, University of Western Ontario, pp. 170-174, 1993.
Watanabe, Kazunari et al., *Eliminate Information Inconsistency for X.500 Directory*, NTT Information and Communication Systems Laboratories, Singapore ICCS, pp. 1180-1184, Nov. 1994.
Barker, Paul, *An Analysis of User Input to an X500 White Pages Directory Service*, IEEE/ACM Transactions on Networking, vol. 3, No. 2, pp. 112-125, Apr. 1995.
Shi, S.S.B., et al.; *An Enterprise Directory Solution With DB2*; IBM Systems Journal; vol. 39, No. 2; 0018-8670; pp. 360-383, 2000.
European Patent Office Examination Report for International Application No. 00 980 695.1; 5 pages, Aug. 4, 2003.
European Patent Office Examination Report for International Application No. 00 980 695.1; 5 pages, Apr. 3, 2007.
S.E. Kille, *Mapping the Global Naming Tree Onto a Relational Database*; Deptarment of Computer Science, University College London, UK; Computer Message Systems - 85, Elsevier Science Publishers B.V., North-Holland; 10 pages, pages 105-114, 1986.
*European Patent Office Examination Report* for International Application No. 03 002 798.1 - 1225; Ref. HD/KT/J43358EPA; 6 pages, Jul. 11, 2007.
Bachmann, D., et al.; *Implement LDAP Search Queries with SQL*; ip.com Prior Art Database, Technical Disclosure, 7 pages, Dec. 1, 1998.
Oracle8*i; Designing and Tuning for Performance*; Release 2 (8.1.6); Part No. A76992-01; XP-002229598; 94 pages, Dec. 1999.
European Patent Office, Communication pursuant to Article 96(2) EPC for Application No. 01 930 950.9 - 1225; 7 pages, Dec. 4, 2006.
*United States Patent Office; Office Action* for U.S. Appl. No. 09/721,806; filed Nov. 24, 2000, in the name of Richard Hans Harvey; 22 pages, Notification Date: Mar. 31, 2008.
U.S. Appl. No. 11/845,476 entitled "Table Arrangement for a Directory Service and for Related Method and Facilitating Queries for the Director" by Richard H. Harvey; 86 total pages, Filed Aug. 27, 2007.
*United States Patent Office; Office Action* for U.S. Appl. No. 10/300,885; filed Nov. 21, 2002, in the name of Richard Hans Harvey; 12 pages, Notification Date: Apr. 7, 2008.
Won Kim; *On Optimizing an SQL-Like Nested Query*; ACM Transactions on Database Systems; vol. 7, No. 3; pp. 443-469; Sep. 1982.
European Patent Office, The Netherlands, Communication pursuant to Article 94(3) EPC dated Dec. 16, 2008, regarding Application No. 03 002 797.3 - 1225 (6 pages), Dec. 16, 2008.
*United States Patent Office; Office Action* for U.S. Appl. No. 10/300,885; filed Nov. 21, 2002, in the name of Richard Hans Harvey; 14 pages, Notification Date: Aug. 6, 2008.

Australian Government letter to Smoorenburg, Examiner's First Report on Patent Application No. 2007201141, 2 pages, Sep. 28, 2008.

Australian Government letter to Smoorenburg, Examiner's First Report on Patent Application No. 2007201142, 2 pages, Sep. 28, 2008.

Australian Government letter to Smoorenburg, Examiner's First Report on Patent Application No. 2007201143, 2 pages, Sep. 28, 2008.

Australian Government letter to Smoorenburg, Examiner's First Report on Patent Application No. 2007201145, 2 pages, Sep. 28, 2008.

Australian Government letter to Smoorenburg, Examiner's First Report on Patent Application No. 2007201149, 2 pages, Sep. 28, 2008.

European Patent Office, The Netherlands, Communication pursuant to Article 94(3) EPC dated Nov. 28, 2008, regarding Application No. 01 930 950.9 (7 pages), Nov. 28, 2008.

U.S. Patent and Trademark Office, *Office Action* for U.S. Appl. No. 10/174,824, filed Jun. 20, 2002, by Richard Hans Harvey, (6 pages), Electronically Transmitted Mar. 4, 2009.

U.S. Patent and Trademark Office, *Office Action* for U.S. Appl. No. 10/336,769, filed Jan. 6, 2003, by Richard Hans Harvey, (6 pages), Electronically Transmitted Jan. 23, 2009.

U.S. Patent and Trademark Office, *Office Action* for U.S. Appl. No. 10/300,885, filed Nov. 21, 2002, by Richard Hans Harvey, (7 pages), Electronically Transmitted Mar. 17, 2009.

European Patent Office, The Netherlands, Communication pursuant to Article 94(3) EPC dated Jun. 16, 2009, regarding Application No. 03 002 796.5 - 1225; Ref. No. HD/KT/J43358EPC (7 pages), Jun. 16, 2009.

Kolotyluk, Eric, "*Using X.500 to Facilitate the Creation of Information Systems Federations*", MS Degree Thesis, Simon Fraser University, Burnaby, Canada, http://ir.lib.sfu.ca/handle/1892/7914, (117 pages), Dec. 1, 1994.

\* cited by examiner

SYSTEM AND METHOD OF OPERATING A DATABASE

CROSS REFERENCE TO RELATED APPLICATIONS

The present application is a continuation-in-part of application U.S. Ser. No. 09/721,806 filed Nov. 24, 2000 and a continuation-in-part of U.S. Ser. No. 09/427,266, filed Oct. 26, 1999 which was a divisional application of U.S. Ser. No. 08/793,575, filed May 22, 1997 (now U.S. Pat. No. 6,052, 681). U.S. Ser. No. 09/427,266 was abandoned in favor of Continuing application 10/336,769 filed Jan. 6, 2003.

BACKGROUND

1. Field

The present application relates to the operational performance of a database, particularly its performance when directory services are being provided.

2. Description of the Related Art

Data managers utilize electronic directories as a tool to integrate data from applications that are not interconnected and to simplify the management of that data. Some electronic directories are standardized, e.g., X.500 or LDAP, and provide various services, e.g., search services, to store and retrieve information quickly. An X.500 or LDAP search service is performed using arguments which indicate, if applicable, where to start the search (baseObject), the scope of the search (subset), the conditions to apply to the search (filter) and what information should be returned (selection). In addition, flags are passed, for example, timelimit, sizelimit, etc to indicate whether aliases, if any, should be dereferenced (searchAliases).

A filter may be empty, consist of a single filter item or may be a compound expression of filter items using connectives (e.g., AND, OR, NOT). The connectives can be used to form arbitrary complex filters. For example, a user may wish to interrogate a directory in order to locate (if any) titles of managers of an organization who have salaries above $60,000.00, and have a mobile phone listed in the database or who are not in certain offices (that begin with "Melb" or begin with "Syd") of the organization.

Such a request could be carried out by way of a search query where:

title=manager AND salary>60000 AND (mobilePhone
  present OR (NOT (locality=Melb*OR
  locality=Syd*)))   expression 100

The above expression 100 can also be expressed as a logical expression:

A.B.(C+!(D+E))   expression 101 where the filter items are represented by letters (A, B, C, D and E) and the connectives are represented by "." for AND connectives, "+" for OR connectives and "!" for NOT connectives.

Where the database has a metadata design, the above expression 101 can be converted into an SQL statement involving self joins of the form:

SELECT eid FROM table WHERE (a) AND eid IN
  (SELECT eid FROM table WHERE (b)) AND
  eid IN (SELECT eid FROM table WHERE (c)
  OR eid NOT IN (SELECT eid FROM table
  WHERE (d) OR (e)   statement 102 where "eid" is used to represent the entry identifier returned by the search and (a), (b), (c), (d) and (e) represents the relevant SQL for each of the filter items.

Figure 1:
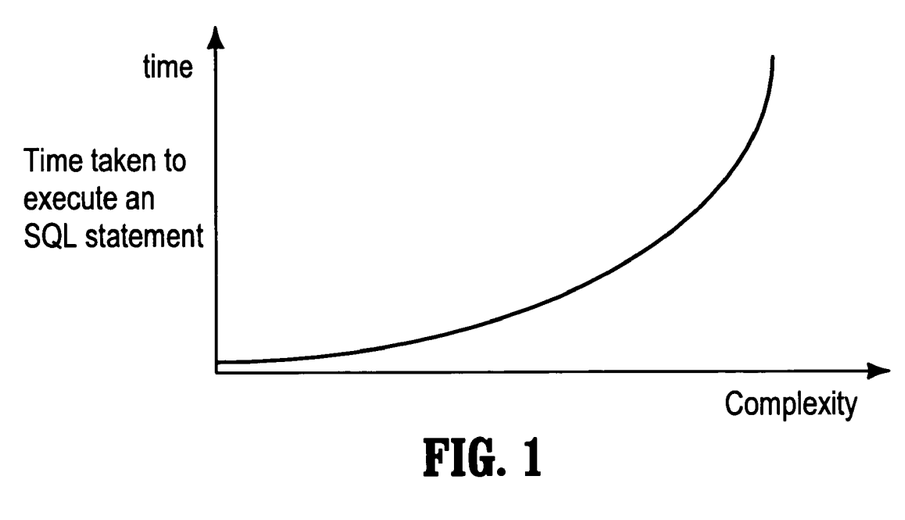
FIG. 1 is a graph illustrating processing time versus complexity of SQL statements.

It is generally desirable, at least from a user's point of view, to have a relatively quick response to queries. Certainly, in SQL based X.500 or LDAP applications running in association with relational database(s), where there may be millions of entries searchable, response time is important. The time taken to process an SQL statement generally increases rapidly with increasing complexity, as is illustrated in FIG. 1. This effect is most noticeable if the SQL includes the NOT connective. This increase in complexity also raises the risk that a result is not returned before a time limit or size limit is reached. As a result, developers of such applications tend to avoid relatively complex SQL statements.

Optimising Terms that Contain OR Connectives

Using logic principles, e.g., Boolean logic, an arbitrarily complex search filter can be expanded to a number of relatively simpler terms. Generally, this involves removing 'brackets' in the complex search filter, resulting in an expression which is an "OR of ANDs" which is also known as a "sum of terms". Expanding a complex filter search can also involve distributing NOT connectives so that each NOT connective applies to a single filter item.

An example of expanding a NOT connective in the filter in expression 103 below:

!(A.B)   expression 103 results in the filter terms:

!A+!B   expression 104 where !A is one filter term and !B is the other filter term. Similarly, expanding the NOT connective in the filter of expression 105 below:

A.B.(C+!(D+E))   expression 105 results in the filter term:

A.B.(C+(!D.!E))   expression 106

This filter term can be further expanded by removing the brackets and the resulting filter terms are A.B.C. and A.B.!D.!E in expression 107 below:

A.B.C+A.B.!D.!E   expression 107

The expansions above resulting in expression 107 show two filter terms OR'ed together. Each filter term of expressions 104 and 107 can be processed and the results summed by the application, ignoring duplicates. This has a number of advantages:

a. The generation of simpler SQL statement resulting in faster processing of the search;

b. More efficient SQL statements and enhanced NOT connective processing, that is described below and in more detail in U.S. application Ser. No. 09/427,266 which is incorporated herein in its entirety by reference; and c. The ability to impose and check size and time limits as a database service query is performed, often leads to performance improvements.

Optimising Terms that Contain AND Connectives

After a complex filter search has been expanded into a number of simpler filter terms, the resulting filter terms, containing only AND connectives, can still result in relatively inefficient expressions when converted into an SQL statement. For example, the expression:

A.B                                                              expression 108 can be converted to an SQL statement of the form:

SELECT eid FROM table WHERE (a) AND eid IN
        (SELECT eid FROM table WHRE (b))          statement 109

However, a filter term can contain more than one AND connective, as exemplified by expression 107 above, and the more AND connectives in the expression, generally, the less efficient the resulting SQL statement may be especially when considering processing response time.

One method for reducing the complexity of an SQL statement is known as 'flattening'. Nested SQL statements can be reduced by flattening the SQL statement. For example statement 109 can be flattened to produce an SQL statement of the form:

SELECT t1.eid FROM table t1, table t2 WHERE t1.
        (a) AND t2.(b) AND t1.eid=t2.eid          statement 110

This statement 110 comprises a number of self-joins (one for each AND connective) and allows a query optimizer to process the stronger clauses first, thus reducing the overall processing time required to evaluate the query.

Expressions that involve NOT connectives, may result in flattened queries that include a LEFT JOIN. These joins are generally time consuming to process, and thus 'flattening' of such a query is considered to require improvement.

For example, the expression:

A.!B                                                             expression 111

Which can be converted to a flattened SQL statement of the form:

SELECT t1.eid FROM table t1 LEFT JOIN table t2
        ON t1.eid=t2.eid AND t2.(b) WHERE t1.(a)
        AND t2.NORM IS NULL                       statement 112

If the filter term involves more than one NOT filter item, e.g. A.!B.!C then the flattened query involves an LEFT JOIN for each NOT but also a join for each combination of NOT filter items. This can become very complex. There is thus still considered to be a need to avoid relatively complex SQL statements in a manner that improves service query performance.

SUMMARY

The present application provides, in one embodiment aspect, a method of processing a database service query that results in improved service query performance. In this embodiment, the method includes receiving a service query that includes a filter having one or more filter items, expanding the filter, and applying at least one condition test to each filter item. An example of a test condition includes determining if each filter item includes a NOT connective and is either of first form or a second form. The first form may be a form of type only and the second form may be a form type and value.

Another example of the condition tests include determining if the filter item can be pre-evaluated to true, or determining if the filter item can be pre-evaluated to false, whereby the whole expanded term can be ignored.

The present application provides, in another embodiment, a directory services arrangement including a plurality of tables, each table having a plurality of rows and columns, and storing arbitrary data, wherein at least one of the tables is a SEARCH table having information used to resolve filters in a search service, means to expand each filter item which results in an expanded term, and condition test means for determining whether a NOT of a filter item is one of a first or second form. The first form can be a form of type only, and the second form can be a form of type and value.

The condition test means may further determine whether the filter item can be pre-evaluated to be true, or whether the filter item can be pre-evaluated to be false. If the filter item is determined to be false then the whole expanded term can be ignored.

In an alternative embodiment, the present application provides a method of processing a database service query, such that a filter is applied to the service query resulting in zero or more filter items, and a condition test is used on each filter item to determine a 'form' of the filter item. Preferably, the condition test determines whether the form of the filter item is a type only form or a form of the filter item is a type and value form. If the filter item is type only form, the filter item is evaluated in accordance with a subtraction method, e.g., an ANSI SQL "except" clause. Preferably, the subtraction method transforms the expression to evaluate the filter item to a form that contains fewer or no NOT connectives.

The method of the above embodiment may also include determining if the form of the filter item is a type and value form, and adding SQL query language representing the filter item to the expression to be evaluated. This process may involve at least one table join operation.

If the form of the filter item is a NOT of a type and value form, then the NOT connective is pushed inside the filter item.

Another embodiment of the present application provides a directory services arrangement that includes a plurality of tables, each table having a plurality of rows and columns, and storing arbitrary data, at least one of the tables being a SEARCH table, having information used to resolve filters in a search service, and condition test means to determine whether a filter item is type only or type and value.

Other embodiments include a computer program product including computer usable medium having computer readable program code and computer readable system code embodied on said medium for applying a condition test to each filter item of a filter to determine if the filter item is type only or type and value, the filter being adapted to be applied to a search service of a directory services arrangement, and/or a computer program product. In this embodiment the computer program product includes a computer usable medium having computer readable program code and computer readable system code embodied on said medium for applying a condition test to each filter item of a filter to determine if the filter item is of a form of type only, or of a form of type and value, the filter being adapted to be applied to a search service of a directory services arrangement.

The present application also provides a method of processing a database service query in which there is provided steps of expanding a filter having filter items, pre-evaluating filter items, and evaluating the filter items.

A method of processing a database service query includes applying a filter to the service query resulting in a plurality of filter items, and processing relatively small items before processing relatively large items.

Definition

In addition to the understanding of those skilled in the art, the following terms and phrases will also include the following:

The term 'filter' refers to an expression that represents conditions applied to a directory search. An example of a filter is !(A.B), provided in expression 103 above;

The phrases 'expanded term' or 'filter term' refer to one or more components of a 'filter' that are expanded. Examples of expanded terms include A.B.C or A.B.!D.!E, provided in expression 107 above; and The phrase 'filter item' refers to a part of a component of either a 'filter' or a 'filter term' or may refer to an expression, such as (X+Y). Examples of filter items include the components A or B of expression 103 or the components A, B, C, !D, or !E of expression 107 or an expression, such as (X+Y).

It should be noted that components A, B, C, D, E or other indicia, components or numerals used throughout the specification are used to represent directory services and/or directory service queries (for example the query expressed in expression 100).

BRIEF DESCRIPTION OF THE DRAWINGS

Preferred embodiments of the present invention will now be described with reference to the accompanying drawings, in which.

DETAILED DESCRIPTION

Optimising Terms that Contain NOT Connectives

The methods according to the present application has realized that there are two types of filter terms or filter items; 1) type only (present) filter items, and 2) type and value filter items. It should be noted that the various embodiments described below may describe type only filter items or type and value filter items. It should be understood that filter terms may be substituted for filter items or combinations of filter items and filter terms may be realized by the methods according to the present application.

Type only filter items include a "present" operator, for example "surname present". Type and value filter items include an attribute, an operator and a value, for example "surname=HARVEY". The operators which require a value include =, >=, <= and substrings.

Figure 2:
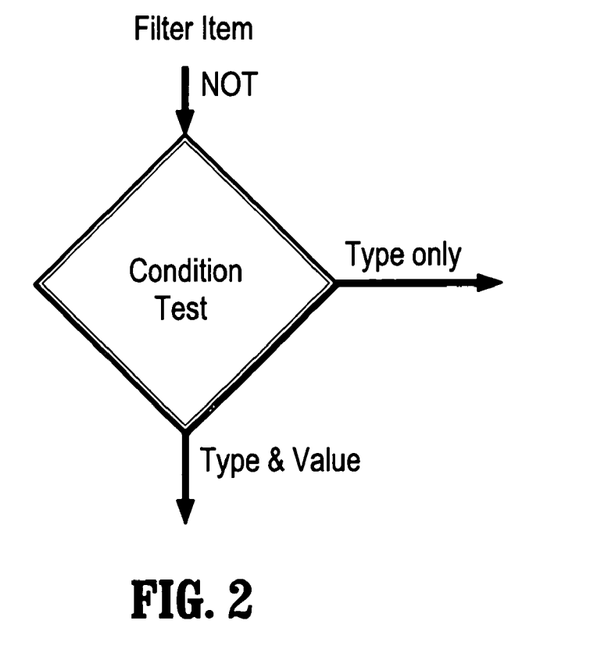
FIG. 2 is a schematic representation of operational flow of a portion of a method according to the present application.

FIG. 2 illustrates an operational flow according to one embodiment of the present application in a relatively simple form. A directory service query can be expanded into a number of filter terms, any of which may have varying degrees of complexity. The method according the present application involves a determination, for each filter item in the filter term, on whether a filter item is a type only or a type and value filter item, and if the filter item is being acted on by a NOT connective. The determination that a filter item is a type only or type and value is also known herein as a condition test.

If the filter item with a NOT connective is a type only filter item then a logical methodology can be utilized to evaluate or process the filter item which avoids a NOT in the SQL. The logical methodology may be a subtraction method expressed in expression 117 below or any other suitable methodology capable of expanding an expression so that the filter item does not contain NOT connectives.

If the filter item with a NOT connective is a type and value filter item then the present application pushes the NOT connective, into the filter item which avoids a NOT in the outer SQL. It is also possible to use a subtraction method, as long as the subtraction method applied takes into account that the attribute (type) being acted on by the NOT connective includes a test for the attribute being present. This is further detailed below with reference to FIG. 5.

Although we refer to further evaluation or processing above, it is to be understood that the methodology of the present application applies a 'condition test' to each filter item having a NOT connective.

Figure 3:
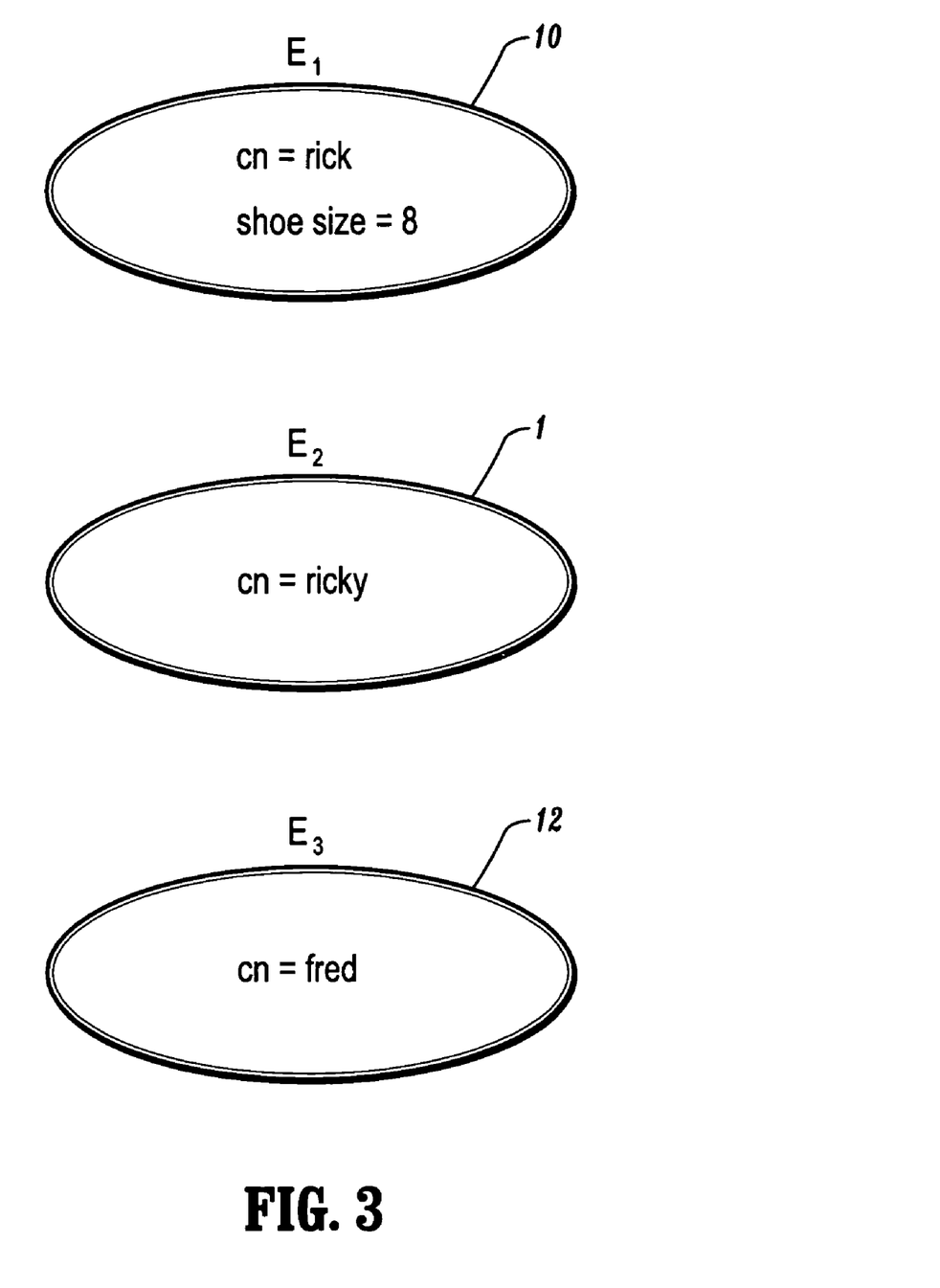
FIG. 3 is a schematic representation of entries in a database.

One consideration associated with NOT processing is that applying a type and value filter item to an entry that does not contain that attribute (type) is undefined. In order to better understand this consideration, a number of examples are detailed below. Referring to FIG. 3 entries in a database, E1, E2 and E3 are provided, each contain information which is searchable, and denoted by reference numerals 10, 11 and 12, respectively. A user desiring to search the information in the database where entries E1, E2 and E3 are stored may utilize one or more filters to retrieve the desired information.

For example, one search S1 may include a filter with filter item B1 so that a search for entries with the common name starting with Rick (cn=rick*, where '*' represents any other indicia) is applied to entries E1, E2 and E3. This search S1 will result in entries E1 and E2 being identified because in these entries cn=rick or ricky.

Another search S2 may include a filter with filter item !B1, so that a search for NOT B1 (NOT (cn=rick*)) is applied to entries E1, E2 and E3. This search S2 will result in E3 being identified because E3 is the only entry that contains a common name not having a value beginning with rick* With this search the consideration above is dealt with because all of the entries contain a common name. Further, S1 is the inverse of S2 and account for all of the entries so that these searches can be said to be inverse searches with type only filter items, which can be expressed as:

$$B1+!B1=1 \qquad \text{expression 113}$$

In another example, with reference again to FIG. 3, a search S3 may include a filter with filter item B2 so that a search for entries with shoe size greater than five (shoe size>5) is applied to E1, E2 and E3. This search will result in entry E1 being identified because E1 is the only entry which defines a shoe size and a shoe size greater than 5.

Another search S4 that includes a filter with filter item !B2, so that a search for NOT B2 (NOT shoe size greater than 5) is applied to entries E1, E2 and E3. This search will result in no matching entries being identified because this filter item can only give a determinable result for entry E1. Applying the filter to entries E2 and E3 is undefined as those entries do not have a shoe size attribute.

Because the result of search S4 with filter item !B2 cannot include entries for which the application of the filter is 'undefined' the searches S3 and S4 are not inverses of one another and do not cover all possible entries and thus can be expressed as:

$$B2+!B2\ 1 \qquad \text{expression 114}$$

From this it can be seen that these filter items are type and value filter items.

There is no complication with a type only filter because the test for "present" is binary as illustrated in FIG. 2. For example, a search S5 that includes a filter with filter item B3 "shoe size present" will result in entry E1 being identified because E1 is the only entry with a shoe size attribute.

Another search S6 includes a filter with a filter item !B3 "NOT shoe size present" will result in entries E2 and E3 being identified because the 'not' search was definable, i.e., the entries not having the attribute provides a definable result.

From this, searches S5 and S6 can be said to be inverse searches with type only filter items and can be expressed as:

$$B3+!B3=1 \qquad \text{expression 115}$$

Recognizing Type Only Filter Items with NOT Connectives

Figure 4:
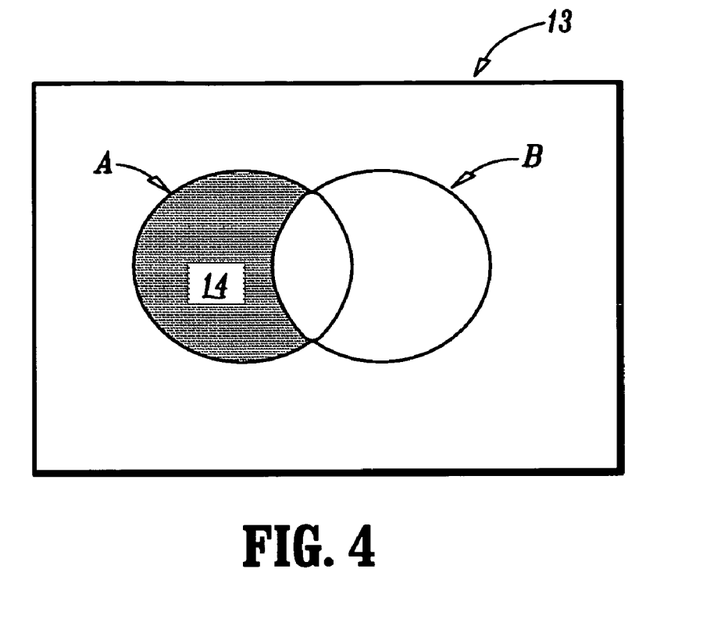
FIG. 4 is a schematic representation of a first form set of data.

With the type only filter item search there is a binary logic such that each entry that the filter item is applied, the result will be true or false. Referring now to FIG. 4, the area within the rectangle 13 shows the total number of entries in a directory, while circles A and B show the entries that satisfy searches applying exemplary filters A and B. The area to the left of intersection of the two circles 14 shows the entries that satisfy the search with filter term A.!B. if the filter item B is a 'type only' filter item.

Evaluating Type only Filters with NOT Connectives

The present application is capable of evaluating or processing type only filter terms or filter items with NOT connectives using a logical methodology that expands an expression so that the filter term or filter item does not contain NOT connectives. The logical methodology may be the subtraction method or any other suitable methodology capable of expanding an expression so that the filter item does not contain NOT connectives. For ease of discussion, the present application will be described using the subtraction method. The subtraction method can be performed by the database using an ANSI SQL "except" clause, or other suitable methods. Alternatively a filter or filter term can be expanded and a directory application can perform the subtraction method on the filter or filter term to remove NOT connectives. This alternative method involves breaking down the filter or filter term containing the NOT connective into two (or more) smaller filter terms which do not contain NOT connectives. For example, a filter term of the form:

$$A.!B \qquad \text{expression 116}$$

can be expressed as:

$$A.(1-B)=>A-A.B \qquad \text{expression 117}$$

where and "A" and "A.B" are the smaller filter terms. Processing these filter terms involves finding the Entry IDentifiers (EIDs) of entries in a database directory that satisfy filter item "A" and storing them in memory. The EIDs of entries that satisfy the filter term "A.B" are found and subtracted from the stored EIDs of filter item A to produce the EIDs that satisfy the original filter or filter term A.!B.

Furthermore, filter terms or filter items considered to be relatively small may be processed first. Thus, as filter term A.B from FIG. 4 is processed less entries would be returned so that this filter term A.B can be performed first to create, for example, an "exclude list". Then, filter item A can be processed and entries which are not in the "exclude list" can be listed as the results of the search.

Recognizing Type and Value Filter Items with NOT Connectives

The present application is capable of evaluating or processing type and value filter terms or filter items with NOT connectives using a logical methodology. As noted above, in type and value filter items it is understood that such filter items may be more complex than type only filter items because such filter items may produce an undefined result for some entries. When processing type and value filter items there may be three possible outcomes to the evaluation of the filter item for each entry:

1) An attribute exists and the value matches the filter item;
2) An attribute exists and the value does not match the filter item; or
3) An attribute does not exist so that the result of applying the filter item to a particular entry is undefined.

Figure 5:
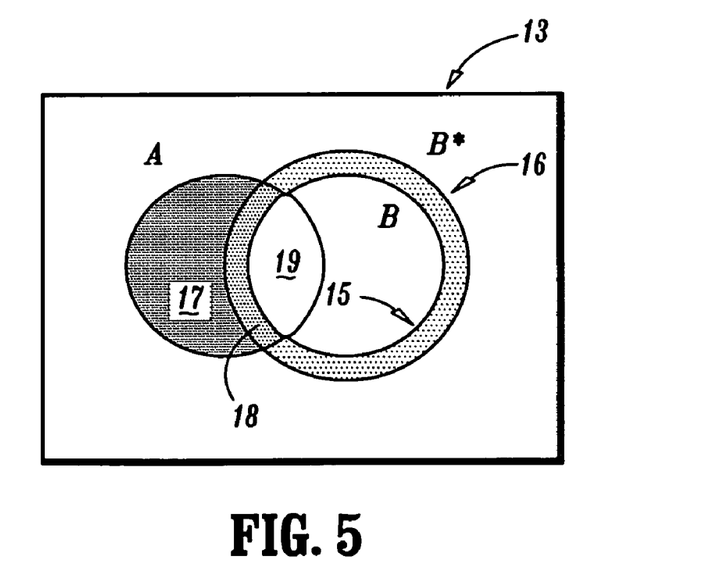
FIG. 5 is a schematic representation of a second form set of data.

In FIG. 5, the area within the rectangle 13 shows the total number of entries in the directory. The inner circle 15, shows the entries that satisfy filter item B, while the outer circle 16 shows the entries that satisfy the filter item B* (where B*=B present). It can now be seen that a filter term:

$$A.!B \qquad \text{expression 118}$$

is undefined for the entries in the cross hashed area 17 of filter item A as filter item B does not exist within those entries. This is a relatively similar situation as detailed with regard to FIG. 3, and the search S4 above, where the result was 'undefined' for some of the entries. The entries returned by the search filter of expression 118 will be the entries denoted by the crescent area 18 intersecting filter items A and B*, but excluding the intersection 19 of filter items A and B.

Evaluating Type and Value Filter Items with NOT Connectives

A logical methodology can also be used to evaluate the portion of the type and value filter item having a NOT connective. The logical methodology may be the a subtraction method expressed in expression 120 below or any other suitable methodology capable of expanding an expression so that the filter item does not contain NOT connectives. In the expressions below filter term A.!B includes filter item !B which is a type and value filter item:

$$A.!B \qquad \text{expression 119}$$

this filter term can be further expanded as:

$$A.(B*-B)=>A.B*-A.B \qquad \text{expression 120}$$

where B* represents B present and is used to remove the entries where the filter item is undefined.

In the filter term of expression 119, the filter item (!B) is a type and value filter item so that:

$$B+!B\ 1 \qquad \text{expression 121}$$

which is relatively similar to expression 114.

If the filter item A is weak (is true for many entries) or B is common (exists in many entries) in expression 120, then the subtraction method, expressed in expression 117, may not be efficient because it results in a join expression involving a weak term. If there is more than one NOT connective of a filter item in a filter term, e.g. A.!B.!C, then the subtraction method would have to evaluate A.B*.C*−A.B−A.C. In this case, the number of join operators increases the chance of one of the filter term components being weak and may result in search performance considered less than optimal.

There is an alternative embodiment for evaluating type and value filter items with NOT connectives which in certain instances may be more efficient than using the subtraction method. In this embodiment, inverse operators are used when processing the filter item. To illustrate, in metadata designs an attribute and value in the filter term can be included in the SQL statement that represents the filter term. Using this methodology the undefined results from a type and value filter item are automatically addressed because the search table layout in the database identifies rows by their attribute identifier (AID) and value (NORMKEY and NORM). As a result, the filter item can be expressed as:

type, operator, value          expression 122 or, if there is a NOT connective being applied to the filter item, the filter item can be expressed as:

NOT (type, operator, value)        expression 123

However, the NOT connective can be 'pushed' inside the filter item and applied to the operator as follows:

type, NOT(operator), value        expression 124

When 'pushing' a NOT connective in to a filter item, the operator may be inverted. This enables the NOT connective of a filter item to be converted from a negative statement (e.g. look for all entries that do not contain a salary greater than 60000) to a positive statement (e.g. look for all entries that do contain a salary attribute with a value that is less than or equal to 60000).

For example, a filter item:

salary>60000             expression 125 and can be represented in an SQL WHERE clause as:

AID=7 AND NORM>60000        statement 126

Similarly, a filter item containing a NOT connective can be expressed as:

NOT(salary>60000)          expression 127 and can be represented in an SQL WHERE clause as:

AID=7 AND NORM<=60000       statement 128

Note that the ">" operator in the filter item has been converted into a "<=" operator in the SQL statement.

With the above filter items, any entries that do not have a salary attribute will not satisfy the filter item "AID=7" so there is no complication with the filter item being applied to these entries.

Similarly, the filter item:

NOT(surname like MOR*)        expression 129 can be represented in an SQL WHERE clause as

AID=4 and NORM NOT LIKE MOR%    statement 130

Figure 6:
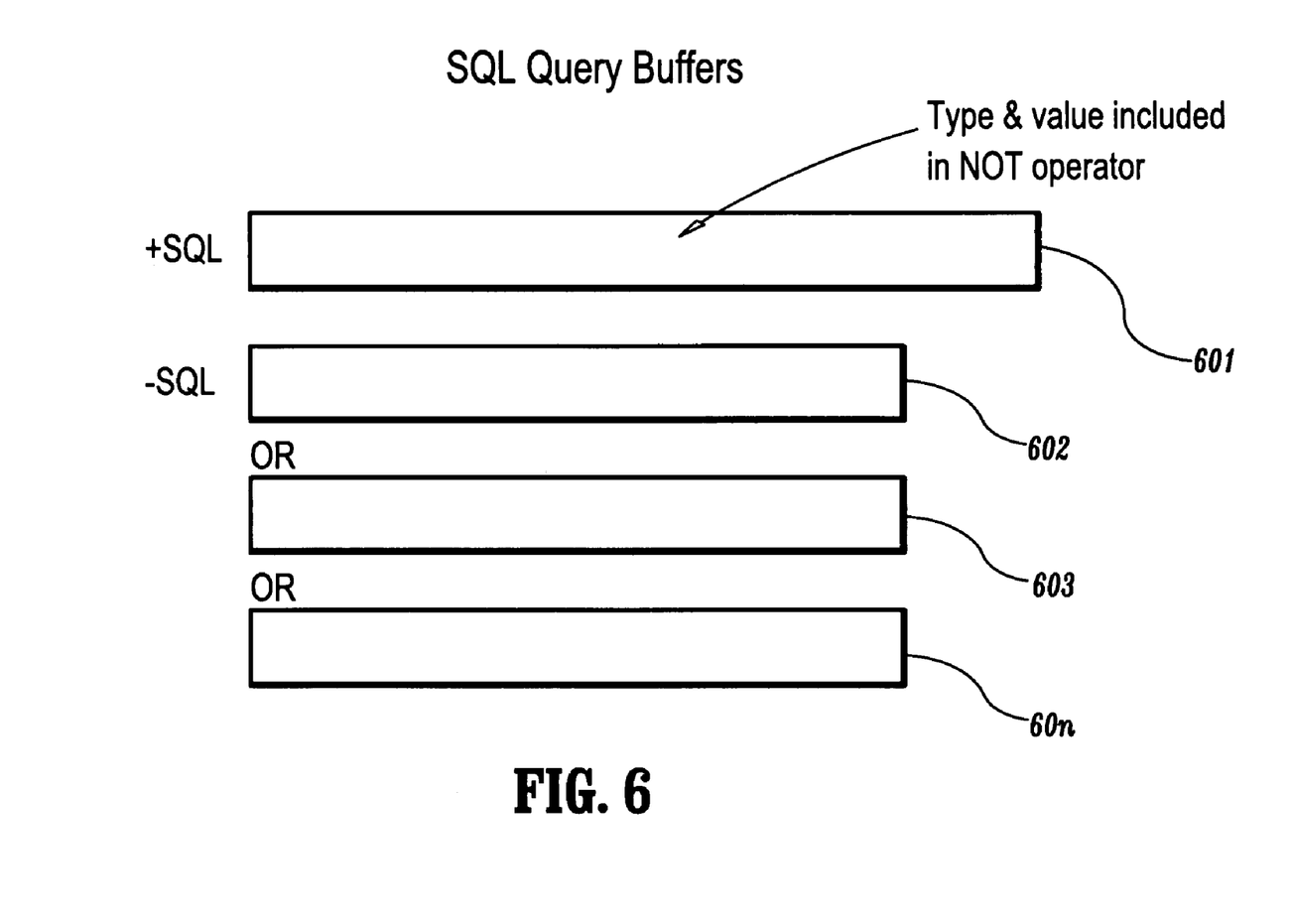
FIG. 6 is an exemplary block representation of SQL query buffers for one form of an SQL query in accordance with one embodiment of the present application.

FIG. 6 illustrates schematically a method of building SQL queries prior to execution according to an alternative method of evaluating type and value filter items with NOT connectives. In this embodiment, positive SQL query buffers 601 and negative SQL query buffer 602n are provided. The negative query buffers are illustrated as separate blocks because they are typically separated by OR operators. The positive query buffer 601 can be provided for filter items and/or results represented by positive SQL queries. Many or all the positive SQL queries can be contained in the positive query buffer 601. Type and value filter items with NOT connectives are in the positive SQL query buffer.

The negative SQL query buffers 602 to n are for storing each of the subtract SQL queries resulting from the processing of filter items with NOT connectives.

In this embodiment, NOT connectives are processed so that the NOT connectives are pushed down to a lowest possible level so that each NOT connective applies to a single comparison when a query is run. Thereafter, type only filter items with NOT connectives that contain an "attribute present" can be processed using the logical methodology (e.g., a subtraction method as described herein above) and type and value filter items with NOT connectives may be processed by reversing the operator and including an attribute identifier component (AID=<value>) to make the filter item a positive filter item. By this we mean that the 'operator' is changed to its complimentary operator, so that, for example, a '>=' operator would become a '<' operator, a '<=' operator would become a '>', a substring would become a NOT substring, and a '=' operator would become a '!=' or '<>' operator. Other operators exist as would be known by those skilled in the art, and thus the previous examples are only to be used as a guide.

Figure 7:
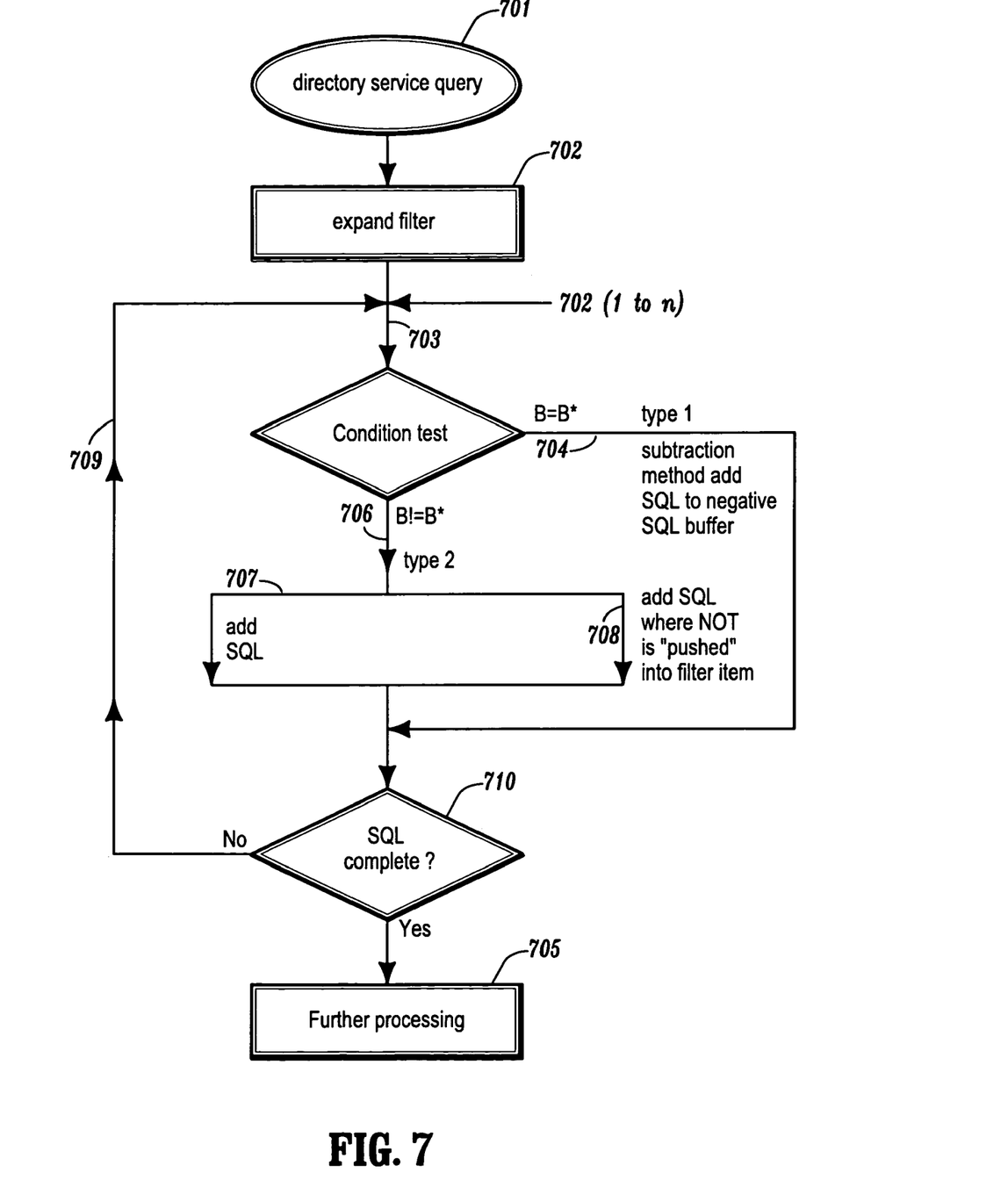
FIG. 7 is a flow diagram of an alternative operational flow of a portion of a method according to the present application.

FIG. 7 illustrates a further embodiment of a method according to the present application. In this embodiment, a directory service query (step 701) is initiated so that a filter is applied during execution of the query, resulting in a number of filter terms or items, 702(1 to n), all of which may have varying degrees of complexity. A test condition (step 703) is then imposed on filter items. That is, a determination is made as to whether each filter term or filter item is a type only or a type and value filter term or filter item.

If the filter item is found to be type only path 704, that is arbitrarily B=B*, where B* means B is present then a subtraction method as detailed below is utilized to add SQL to the negative SQL query buffer. If the filter item is found to be type and value, path 706, that is arbitrarily B !=B*, then SQL is added to the positive SQL query buffer which may involve a table join, path 707. More preferably, NOT connectives are pushed into the filter item, path 708. A determination is then made as to whether or not SQL building is complete or whether the filter item has been expanded (Step 710). If the answer to step 710 is 'no', then the condition test is applied to the next filter item (step 703). If the answer to 710 is 'yes', then further processing can be undertaken (step 705). In accordance with the present application, it may also be possible to have one or more filter items processed via path 707 and/or one or more filter items processed via path 708. Filter items that do not involve NOT connectives, can follow path 707 and add the SQL to the positive SQL query buffer.

Figure 8:
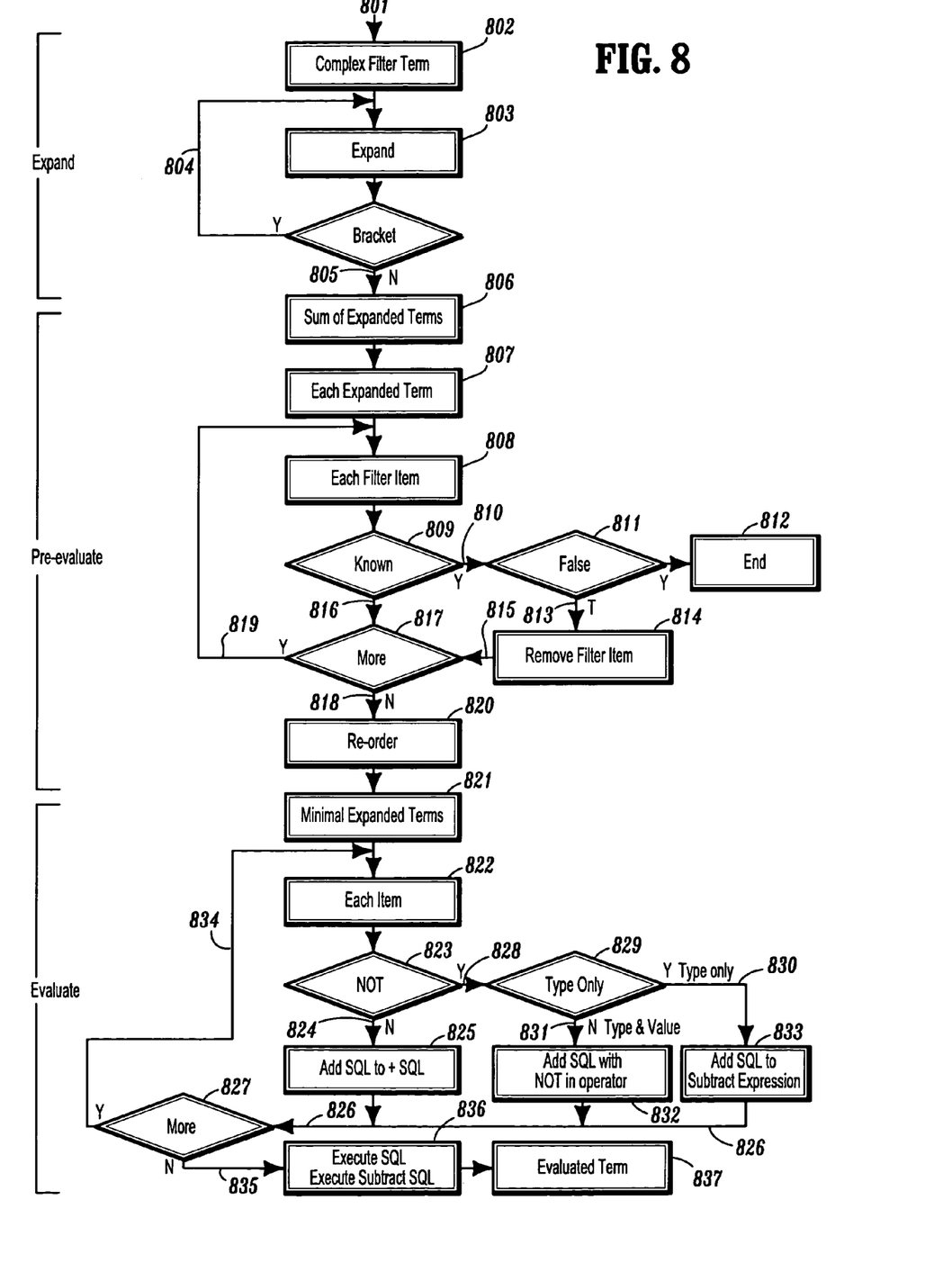
FIG. 8 is a flow diagram of an alternative operational flow of a portion of a method according to the present application.

FIG. 8 illustrates a still further embodiment of the method according to the present application. FIG. 8 illustrates an implementation of a method in which the are three processing steps, namely, expand, pre-evaluate and evaluate, are performed.

A directory service query is initiated (step 801) so that a filter having a complex filter term is applied (step 802). This filter, having a complex filter term is then expanded (step 803). A determination is then made on whether or not further expansion of the expanded term is possible and/or desirable. One way of doing this is to see if the expanded term resulting from the expansion in step 803 includes any bracketed terms. If it does include one or more bracketed terms, then the expanded term is again expanded (steps 803, 804). If the expanded term does not include one or more bracketed terms and/or the current expansion of the expanded term is considered to be sufficient or completed, then the resulting filter items, which may have varying degrees of complexity, from the expansion form a sum of expanded terms (step 806).

Having a set of expanded terms, the next step, that of pre-evaluation can be performed. This pre-evaluation process looks, inter-alia, to remove the need to evaluate terms for which the result is already known. For example, if a filter item contained an attribute that was known not to exist in the database, then we consider the result already known to be either true or false. Taking each expanded term in step 807, each filter item is identified (step 808), and each filter item from step 808 and/or the expanded term from step 807 is tested to see if the result of that filter item and/or expanded term is already known (step 809). If the result is known, path 810 is followed, and the known filter item or expanded term is again tested to determine whether the result is true or false (step 811). If the result of the filter item is false, the evaluation is ended (step 812). If the result of the filter item is true, path 813 is followed, and the known and true filter item is removed (step 814). Path 815 is then followed.

To illustrate, in the expression:

A.B.!C                                           expression 131

If it is known that filter item B=0, such as the process is looking for an empty string, then the expression 131 will evaluate to zero (i.e., the result is known and false), and the path to 812 can be followed and the process is finished for that filter item or the expanded term. The process can then continue for other expanded terms or filter items. If it is known that filter item B=1, such as object class is present, then expression 131 will evaluate to:

A.!C                                             expression 132

(i.e., the result is known and true) and thus the process can remove the filter item 'B' at step 814 in FIG. 8.

If it is known that filter item C is undefined, such as the case where C is looking for shoe size greater than a particular value, but there is no shoe size attribute in the database, then the filter item !C is also undefined. In this case, the expanded expression 132 will evaluate to zero (i.e., the result is known and false) and path 812 can be followed and the process is finished for that filter item or the expanded term.

If the filter item and/or expanded term is not known in step 809, path 816 is followed, and a further determination is made to determine whether further pre-evaluation is needed (step 817). If, further pre-evaluation is needed or determined to necessary, path 819 is followed to step 808 where the process described above is repeated. If there is no further known filter items and/or expanded terms, path 818 is followed, and a the remaining filter items are re-ordered in a manner that groups positive filter items and negative filter items (step 820). Furthermore, grouping positive filter items and negative filter items separately is preferable because a set of expanded min-terms can be obtained (step 821). To illustrate, the filter term:

A.!B.C.!D                                        expression 133 can be re-ordered to obtain a set of expanded min-terms:

A.C.!B.!D                                        expression 134

If there is no further pre-evaluation needed, the next step of the present application, that of evaluation, is undertaken.

Each filter item in the reordered groupings is tested to determine if the filter item includes one or more NOT connectives (steps 822 and 823). If the filter item being tested does not include a NOT connective, path 824 is followed, and SQL equating to the filter item is then added to a positive SQL query buffer (similar to buffer 601 of FIG. 6) (step 825). After the SQL is added to the buffer, a determination is made as to whether there are any further filter items to be evaluated (step 827).

If in step 823 the filter item does include one or more NOT connectives, path 828 is followed, and a test condition similar to that described in relation to FIG. 2 is performed (step 829). The test determines whether the filter item is type only filter item or a type and value filter item. If the filter item is determined to be type and value (path 831), then the NOT connective is 'pushed' into the operator, and SQL equating to this NOT term is added to the positive SQL query buffer (step 832).

After the SQL is added to the buffer, a determination is made as to whether there are any further filter items to be evaluated (step 827).

If in step 829 the filter item is a type only filter item, path 830, then a subtraction method is utilized to evaluate the filter item, and SQL equating to the filter item is added to a negative SQL query buffer (similar to buffers 602, 603, 60*n* in FIG. 6) (step 833). After the SQL is added to the buffer, a determination is made as to whether there are any further filter items to be evaluated (step 827).

In step 827, if further filter items need to be evaluated, path 834 is followed and the process from step 822 is repeated. If no further filter items need evaluation (path 835), and the SQL is executed (step 836) and the filter term is evaluated (step 837).

The step of execution 836 may be performed a number of ways. One method is evaluate the negative and positive SQL sub-expressions together using the ANSI 'SQL EXCEPT' connector(s).

Another method is to evaluate the negative and positive SQL expressions separately and for the application to do the subtraction itself.

Still a further method involves placing the negative SQL into buffers, separated by OR connectives, evaluating each negative buffer and placing the result into an 'exclude list'. This provides a number of relatively smaller SQL expressions to evaluate. The positive SQL expressions can then be evaluated and placed into a 'results list' if not in the 'exclude list'. This allows he subtraction to be done whilst the positive results are being collected.

Figure 9:
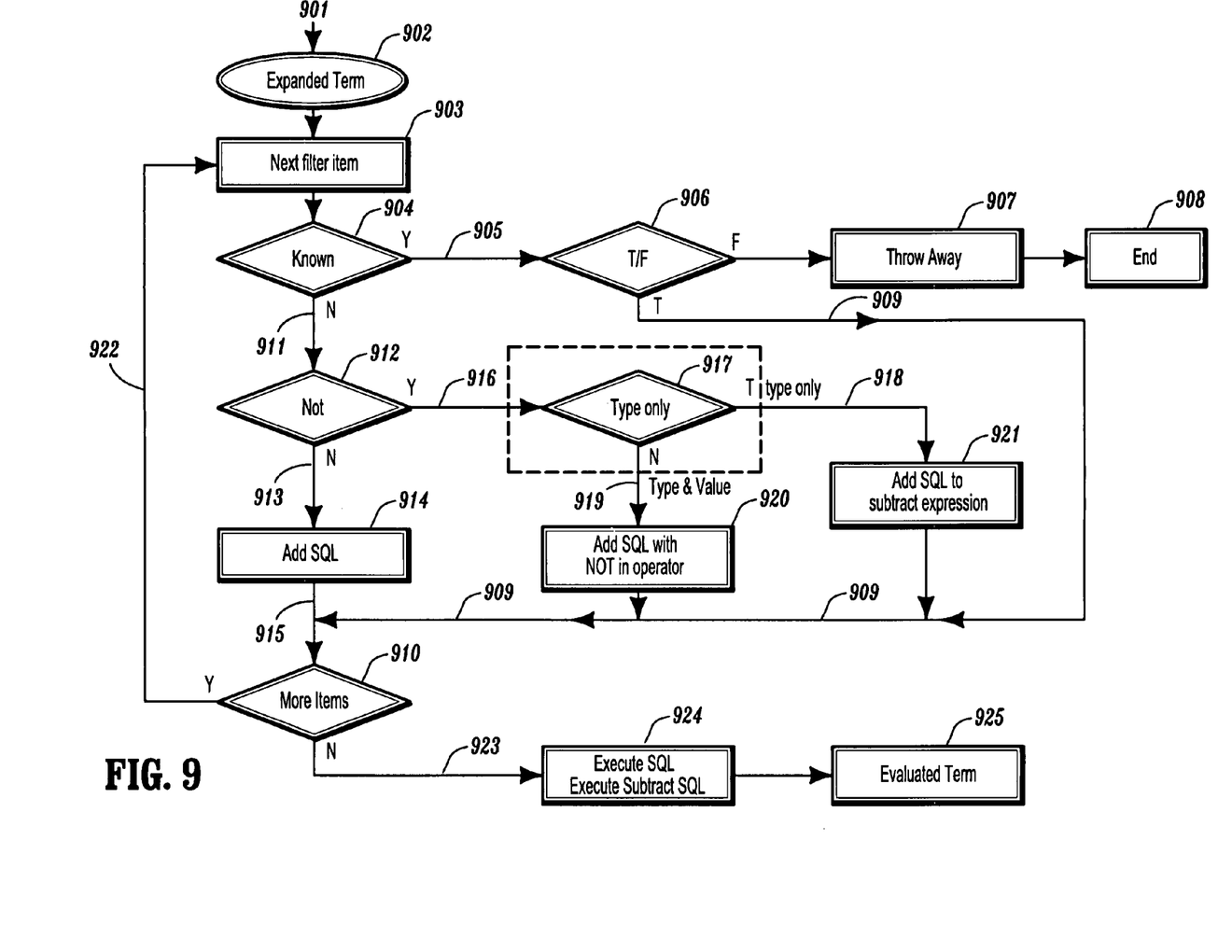
FIG. 9 is a flow diagram of an alternative operational flow of a portion of a method according to the present application.

FIG. 9 is a flow diagram of another alternative embodiment according to the present application. A directory service query is initiated, a filter is applied and an expanded term is obtained (steps 901, 902). Taking each filter item 903, a test 904 is performed to see if the result of that filter item is already known. This embodiment, although referring to filter item can equally apply to the expanded term. If the result is known, path 905 is followed, and the known filter item is again tested to determine if known filter item 903 is true or false (step 906). If the known filter item is false, the filter term is discarded (step 907) and the process of evaluation is ended (step 908) for that filter term. If the known filter item 903 is true, path 909 is followed and a test is then performed to determine whether more filter items require processing (step 910).

If in step 904 the filter item is not known, path 911 is followed, and a test is performed to determine whether the filter item includes a NOT connective (step 912). If the filter item does not include a NOT connective, path 913 is followed and SQL equating to the filter item is then added to a positive SQL query buffer (similar to buffer 601 of FIG. 6) (step 914). After the SQL is added to the buffer a test is then performed to determine whether more filter items require processing (step 910).

If in step 912 the filter item does include a NOT connective, path 916 is followed, and a test condition similar to that described in relation to FIG. 2 is performed (step 917). The test determines whether the filter item is a type only filter item or a type and value filter item. If the filter item is a type and value filter item the NOT connective is 'pushed' into the SQL, and SQL equating to this NOT connective is added to the positive SQL query buffer (similar to buffer 601 of FIG. 6) (step 920). After the SQL is added to the buffer a test is then performed to determine whether more filter items require processing (step 910).

If in step 917 the filter item is a type only filter item, then SQL equating to the filter item is added to a negative SQL query buffer (similar to buffers 602, 603, 60n in FIG. 6) (step 921). After the SQL is added to the buffer a test is then performed to determine whether more filter items require processing (step 910).

As noted above, in step 910 the test determines whether further filter items require evaluation. If further evaluation is needed, path 922 is followed and the process from step 903 is repeated. If no further items require evaluation, the SQL is executed (step 924), preferably in a manner similar that of step 836 in FIG. 8, and giving a result (step 925).

Basically, and in summary, the present application has realized that terms of directory services contain (potentially) two different types of filter items. The present application thus determines each type of filter item, selects the appropriate evaluation, in accordance with, for example, expressions 117, 120 or 124 for type and value items, respectively, and/or the implementation(s) described in this specification, and in this manner determines an optimized or improved processing of directory services.

It is to be noted that the present application should not be limited to only those embodiments described. A skilled person will understand that the present application can be implemented in a relatively large number of different and varying situations.

What is claimed is:

1. A computer-implemented method of processing a database service query, comprising:
   receiving, using a computer, a service query, the service query comprising a filter that comprises one or more filter items;
   expanding, using the computer, the filter of the service query;
   applying, using the computer, a condition test to each filter item of the expanded filter, the condition test comprising:
      determining if the filter item comprises a NOT connective; and
      determining if the filter item comprises one of a type only filter item or a type and value filter item; and
   if a determination is made that the filter item comprises a NOT connective and a type only filter item, applying, using the computer, a logical methodology to evaluate the filter item, the logical methodology comprising expanding an expression of the filter item so that the filter item does not comprise the NOT connective.

2. The method as claimed in claim 1, wherein the logical methodology comprises a subtraction method.

3. The method as claimed in claim 1, further comprising, if a determination is made that the filter item comprises a NOT connective and a type and value filter item, pushing the NOT connective associated with the type and value filter item inside the filter item, resulting in changing an operator inside the filter item.

4. The method as claimed in claim 1, wherein the condition test further comprises determining if each filter item pre-evaluates to true.

5. The method as claimed in claim 1, wherein the condition test further comprises determining if each filter item pre-evaluates to false, such that an expanded term of the expanded filter is ignored.

6. The method as claimed in claim 1, wherein expanding the filter comprises expanding the filter to a minimum set of terms.

7. A directory services arrangement comprising:
   a plurality of tables, each table comprising a plurality of rows and columns, operable to store arbitrary data in a search service, at least one of the tables comprising information for resolving filters that comprise at least one filter item;
   means for expanding each filter into an expanded term;
   condition test means operable to determine:
      whether each filter item comprises a NOT connective; and
      whether each filter item comprises one of a type only filter item or a type and value filter item; and
   means for applying, if a determination is made that the filter item comprises a NOT connective and a type only filter item, a logical methodology to evaluate the filter item, the logical methodology comprising expanding an expression of the filter item so that the filter item does not comprise the NOT connective.

8. The directory services arrangement as claimed in claim 7, wherein the logical methodology comprises a subtraction method.

9. The directory services arrangement as claimed in claim 7, wherein, if a determination is made that the filter item comprises a NOT connective and a type and value filter item, a NOT connective associated with a type and value filter item is pushed inside the filter item resulting in changing an operator inside the filter item.

10. The directory services arrangement as claimed in claim 7, wherein the condition test means is further operable to determine if each filter item pre-evaluates to true.

11. The directory services arrangement as claimed in claim 7, wherein the condition test means is further operable to determine if each filter item pre-evaluates to false, such that an expanded term of the expanded filter is ignored.

12. The directory services arrangement as claimed in claim 7, wherein the condition test means is further operable to:
   determine if each filter pre-evaluates to true and inverted by a NOT connective; and
   if a determination is made that a particular filter pre-evaluates to true and is inverted by a NOT connective, ignore the expanded term.

13. A computer-implemented method of processing a database service query, comprising:
   receiving, using a computer, a service query;
   applying, using the computer, a filter to the service query resulting in zero or more filter items;
   applying, if one or more filter items results, a condition test, using the computer, to each filter item to determine whether the filter item comprises one of a type only filter item or a type and value filter item; and
   if a determination is made that the filter item comprises a NOT connective and a type only filter item, applying, using the computer, a logical methodology to evaluate the filter item, the logical methodology comprising expanding an expression of the filter item so that the filter item does not comprise the NOT connective.

14. The method as claimed in claim 13, wherein the logical methodology comprises a subtraction method.

15. The method as claimed in claim 14, wherein the subtraction method comprises using an ANSI SQL "except" clause.

16. The method as claimed in claim 14, wherein the subtraction method comprises transforming each filter item to a form that contains fewer or no NOT connectives.

17. The method as claimed in claim 13, comprising, if the filter item is a type and value filter item, adding SQL representing the filter item to an expression to be evaluated by performing at least one table join.

18. The method as claimed in claim 13, comprising, if the filter item is an inverse of the type and value filter item, pushing the NOT connective inside the filter item.

19. The method as claimed in claim 18, further comprising applying the pushed NOT connective to an operator.

20. The method as claimed in claim 19, wherein the step of applying the pushed NOT is effected by inverting the operator.

21. A directory services arrangement comprising:
one or more memory modules operable to store a plurality of tables, each table comprising a plurality of rows and columns, operable to store arbitrary data, at least one of the tables comprising information for resolving filters that comprise at least one filter item in a search service; and
one or more processing units operable to:
execute a condition tester operable to determine:
whether each filter item comprises a NOT connective; and
whether each filter item comprises a type only filter item or a type and value filter item; and
apply, if a determination is made that the filter item comprises a NOT connective and a type only filter item, a logical methodology to evaluate the filter item, the logical methodology comprising expanding an expression of the filter item so that the filter item does not comprise the NOT connective.

22. The directory services arrangement as claimed in claim 21, wherein the logical methodology comprises a subtraction method.

23. The directory services arrangement as claimed in claim 21, wherein, if determined that the filter item comprises a NOT connective and a type and value filter item, a NOT connective associated with the type and value filter item is pushed inside the filter item resulting in changing an operator inside the filter item.

24. The directory services arrangement as claimed in claim 21, wherein the condition tester is further operable to determine if each filter item pre-evaluates to true.

25. The directory services arrangement as claimed in claim 21, wherein the condition tester is further operable to determine if each filter item pre-evaluates to false, such that an expanded term of the expanded filter is ignored.

26. The directory services arrangement as claimed in claim 21, wherein the condition tester is further operable to:
determine if each filter item pre-evaluates to true and is inverted by a NOT connective; and
if the determination is made that a particular filter item pre-evaluates to true and is inverted by a NOT connective, ignore the expanded expression of the particular filter item.

27. A computer program for processing a database service query, the program being embodied on a computer-readable medium and having instructions for causing a processor to perform operations comprising:
receiving a service query, the service query comprising a filter comprising one or more filter items;
expanding the filter;
applying a condition test to each filter item of the expanded filter, the condition test comprising:
determining if the filter item comprises a NOT connective; and
determining if the filter item comprises one of a type only filter item or a type and value filter item; and
if a determination is made that the filter item comprises a NOT connective and a type only filter item, applying a logical methodology to evaluate the filter item, the logical methodology comprising expanding an expression of the filter item so that the filter item does not comprise the NOT connective.

\* \* \* \* \*

UNITED STATES PATENT AND TRADEMARK OFFICE
CERTIFICATE OF CORRECTION

PATENT NO. : 7,631,012 B2 Page 1 of 1
APPLICATION NO. : 09/844043
DATED : December 8, 2009
INVENTOR(S) : Richard Hans Harvey It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 375 days.

Signed and Sealed this

Second Day of November, 2010

David J. Kappos
*Director of the United States Patent and Trademark Office*